United States Patent [19]

Marisetty

[11] Patent Number: 5,574,868
[45] Date of Patent: Nov. 12, 1996

[54] BUS GRANT PREDICTION TECHNIQUE FOR A SPLIT TRANSACTION BUS IN A MULTIPROCESSOR COMPUTER SYSTEM

[75] Inventor: Suresh Marisetty, San Jose, Calif.

[73] Assignee: Intel Corporation, Santa Clara, Calif.

[21] Appl. No.: 62,065

[22] Filed: May 14, 1993

[51] Int. Cl.⁶ ........................................... G06F 12/00
[52] U.S. Cl. .................. 395/298; 395/494; 395/496; 395/297; 395/287
[58] Field of Search .................. 395/325, 400, 395/425, 477, 478, 494, 496, 495, 287, 297, 293, 298

[56] References Cited

U.S. PATENT DOCUMENTS

| | | | |
|---|---|---|---|
| 4,159,532 | 6/1979 | Getson, Jr. et al. | 395/425 |
| 4,757,439 | 7/1988 | Stinson et al. | 395/483 |
| 4,792,926 | 12/1988 | Roberts | 365/189.04 |
| 4,980,854 | 12/1990 | Donaldson et al. | 395/325 |
| 5,032,985 | 7/1991 | Curran et al. | 395/425 |
| 5,278,974 | 1/1994 | Lemmon et al. | 395/425 |
| 5,297,292 | 3/1994 | Morimoto et al. | 395/725 |
| 5,440,698 | 8/1995 | Sindhu et al. | 395/200.08 |

*Primary Examiner*—Rebecca L. Rudolph
*Attorney, Agent, or Firm*—Blakely, Sokoloff, Taylor & Zafman

[57] ABSTRACT

A early bus grant prediction technique combines the operating advantages of both a split transaction bus and a simple shared bus. When a read request is generated by a memory access requester, an early bus request is generated for the impending data transfer. The early bus request is provided to bus grant prediction and arbitration logic that determines whether or not the bus will be available at the time the requested data has been retrieved and is ready for transfer. If the bus is available, the retrieved data is routed immediately to the memory bus for a fly-by transfer. On the other hand, if the bus is not available, the data is routed to a FIFO buffer to be transferred when the bus is available.

11 Claims, 2 Drawing Sheets

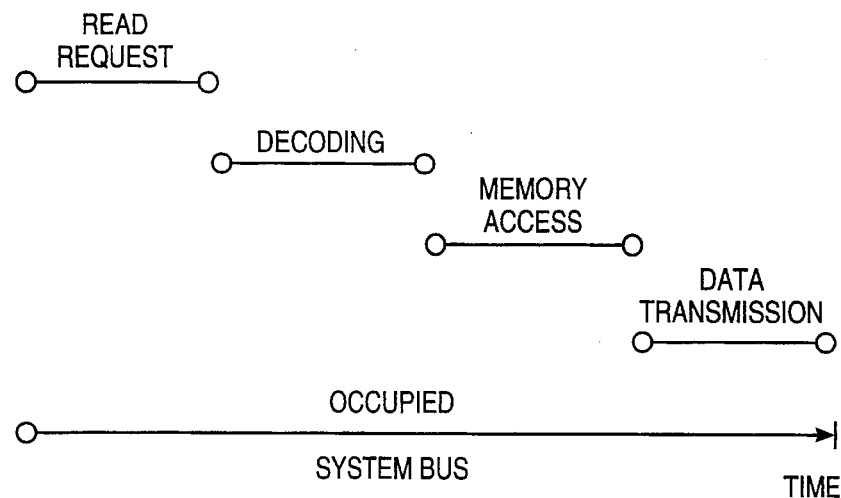
FIG_1 (PRIOR ART)
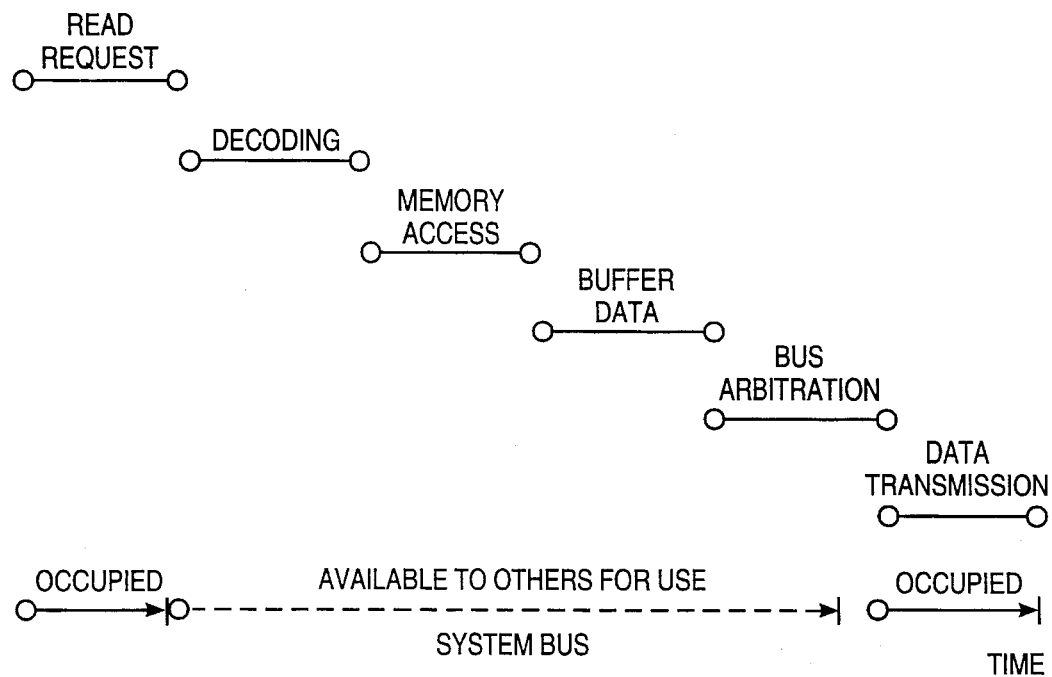
FIG_2 (PRIOR ART)

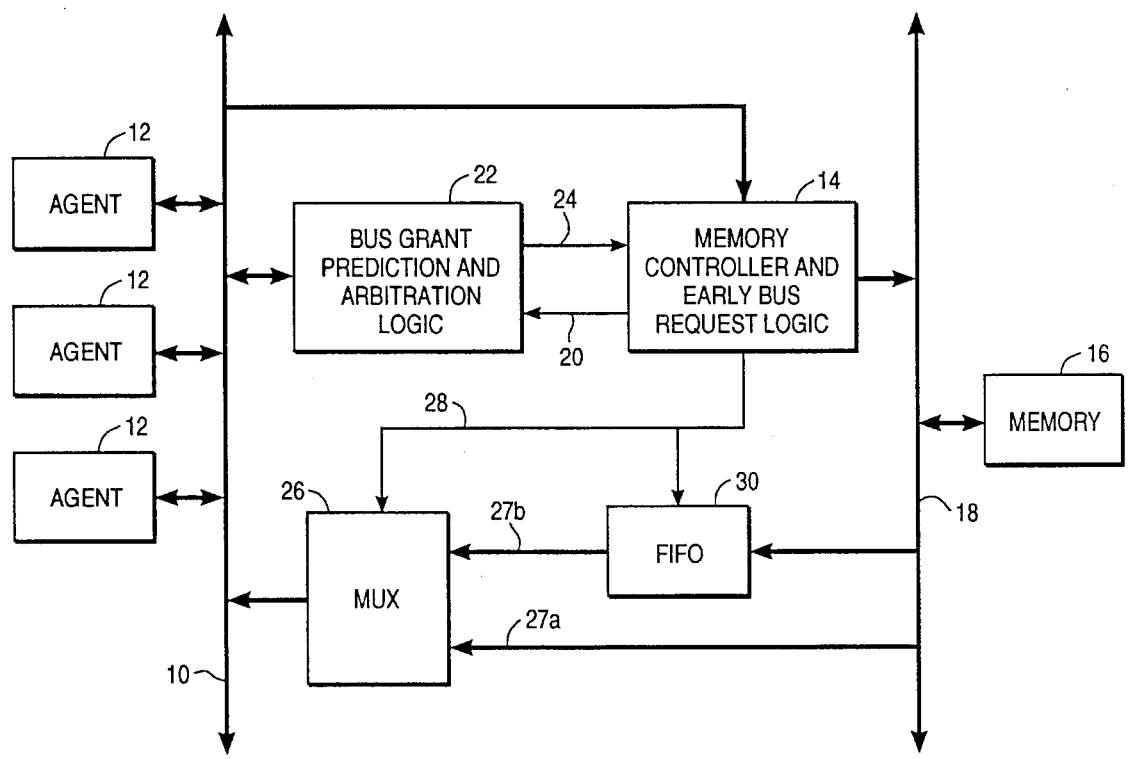
FIG_3
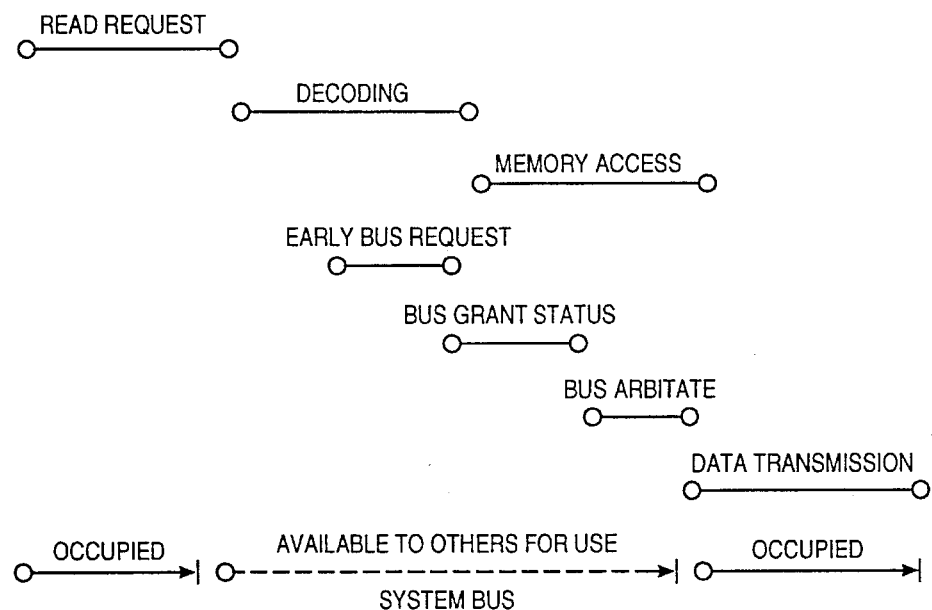
FIG_4

BUS GRANT PREDICTION TECHNIQUE FOR A SPLIT TRANSACTION BUS IN A MULTIPROCESSOR COMPUTER SYSTEM

BACKGROUND OF THE INVENTION

1. Field of the Invention

This invention relates generally to the field of data communications within a multiprocessor computer system, and particularly to a technique for optimizing the memory response time of a shared memory system utilizing a split transaction bus for burst data transfers.

2. Background Art

Modern data processing systems typically include a main memory system constructed with dynamic random access memory (DRAM) devices. The main memory system communicates by way of a memory bus or system bus with other agents of the system such as processors and direct memory access (DMA) masters. A memory controller directs data into and out of the main memory system. High performance systems with multiple processing units require a greater bandwidth on the memory bus to handle the multiple memory access requests generated by the multiple processing units.

One technique for increasing the effective bus bandwidth required in multiprocessor systems is the use of a split transaction bus. In a split transaction, an agent of the system requests a memory access, thereby initiating a transaction, and the transaction is completed when the requested data is supplied by the memory system. In the interval between the memory request and the transfer of data fulfilling the request, the memory bus is available for other transactions. While this technique increases the effective bandwidth of the memory bus, it does so at the expense of longer latencies. If a multiprocessor system is configured with only a single processor, a split transaction bus actually degrades performance of the system due to the increased latencies which could be avoided by using a simple shared memory bus.

At the present time, there are relatively few operating systems and applications programs that exploit the power and performance of a multiprocessor system. Thus, a multiprocessor system will frequently operate in a uniprocessor mode. For example, a system that is multiprocessor (MP) ready for OS/2 or UNIX will operate in a uniprocessor mode when running DOS. Therefore, it is desirable that a multiprocessor system be designed to optimize bus performance in a uniprocessor mode as well as a multiprocessor mode.

As mentioned above, a simple shared memory bus minimizes memory access latencies in a uniprocessor environment. FIG. 1 illustrates the sequence of events for a single transaction on a simple shared memory bus. A read request is issued by a requesting agent and transmitted on the memory bus. The request is received by the memory controller and decoded to generate the control signals that retrieve the requested data from the memory. The data is then transmitted on the memory bus to the requesting agent. The bus is occupied for the entire time of the transaction from the initiation of the read request to the completion of the data transmission. No bus arbitration is required since the bus is owned by the requesting and responding agents for the duration of the transaction. Thus, access to the bus is denied to all other agents in the system.

Operation of a typical split transaction bus is illustrated in FIG. 2. A transaction is similarly initiated by a read request from a requesting agent. As in a simple shared bus implementation, the read request is received by the memory controller which decodes the request and generates the memory access control signals. However, unlike the simple shared bus, the split transaction bus is occupied only during the time that the read request is transmitted. The bus is then made available to other agents while the request is decoded and requested data is retrieved from the memory. The retrieved data is typically stored in a first in, first out (FIFO) data buffer until the bus is again available to transmit the data to the requesting agent. When the data is available for transfer, a bus arbitration and grant sequence arbitrates active bus access requests from other requesting and responding agents and then assigns the bus to the responding agent to transmit the data to the requesting agent. As can be seen, bus availability is increased, but memory response latency is also increased due to the sequential nature of the memory read, memory bus arbitration, bus grant and data transmission operations. Of course, such increase in latency could be avoided by sending the accessed data directly onto the memory bus as it is retrieved from the memory; however, this would require that access to the bus be denied to other agents prior to and during the time that the data is retrieved in order to avoid bus collisions. Such an approach would therefore negate most of the increase in bandwidth achievable with the split transaction technique.

SUMMARY OF THE INVENTION

The present invention combines the operating advantages of both a split transaction bus and a simple shared bus by implementing an early bus grant prediction technique. When a read request is generated by a memory access requester, an early bus request is generated for the impending data transfer. The early bus request is provided to bus grant prediction and arbitration logic that determines whether or not the bus will be available at the time the requested data has been retrieved and is ready for transfer. If the bus is available, the retrieved data is routed immediately to the memory bus for a fly-by transfer. On the other hand, if the bus is not available, the data is routed to a FIFO buffer to be transferred when the bus becomes available.

In a uniprocessor environment, the bus appears to the memory system as a simple shared bus since fly-by transfers will always be performed. Likewise, in a lightly loaded multiprocessor environment with the bus idling between request and response, the bus will also appear to the memory system as a simple shared bus. In a multiprocessor environment with multiple contenders for bus access, the bus appears to the memory system as a conventional split transaction bus.

BRIEF DESCRIPTION OF THE DRAWINGS

FIG. 1 illustrates a memory access transaction in a prior art simple shared bus.

FIG. 2 illustrates a memory access transaction in a prior art split transaction bus.

FIG. 3 is a block diagram of a memory system according to the present invention.

FIG. 4 illustrates a memory access transaction implemented by the present invention.

DETAILED DESCRIPTION OF THE INVENTION

In the following description, for purposes of explanation and not limitation, specific details are set forth in order to provide a thorough understanding of the present invention.

However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

FIG. 3 is a functional block diagram of a memory system that combines the operating advantages of a split transaction bus and a simple shared bus. A high speed split transaction system bus 10 connects a plurality of system agents 12, including one or more processing units. A memory read request is transmitted by one of the system agents to memory controller 14. The read request is decoded by controller 14 and transmitted to memory 16 on memory bus 18. Following a decoding sequence of the read request, memory controller 14 knows the memory access latency in a deterministic fashion. While the memory access is in progress, memory controller 14 sends an early bus request signal on line 20 to prediction and arbitration logic unit 22.

Prediction and arbitration logic unit 22 includes a bus occupation state machine that tracks the ownership and arbitration status of system bus 10. In an exemplary embodiment, the bus occupation state machine predicts bus status up to seven clocks ahead and has the following states:

DI: Data bus unused this clock, available next clock

DR: Data bus booked for response in next clock

DC: Data bus booked for data following command in next clock

D7: Data bus busy this and the next 7 clocks, allow one dead clock

D6: Data bus busy this and the next 6 clocks, allow one dead clock

D5: Data bus busy this and the next 5 clocks, allow one dead clock

D4: Data bus busy this and the next 4 clocks, allow one dead clock

D3: Data bus busy this and the next 3 clocks, allow one dead clock

D2: Data bus busy this and the next 2 clocks, allow one dead clock

D1: Data bus busy this and the next 1 clock, allow one dead clock

D0: Data bus busy this clock, allow one dead clock

Upon receiving an early bus request signal from memory controller 14, prediction logic in unit 22, based on information from the bus occupation state machine, returns appropriate bus grant status signals on line 24 to memory controller 14. These signals inform the memory controller of the exact time when system bus 10 will be available for data transmission.

Based on the information provided by the bus grant status signals, memory controller 14 is informed as to whether or not system bus 10 will be available at the time the requested data is retrieved from memory 16 and placed on memory bus 18. If it is known that the system bus will be available, the data is routed directly to system bus 10 through multiplexer 26. Control signals on line 28 from memory controller 14 select multiplexer input 27a to route the data onto the system bus for a "fly-by" transfer.

If it is determined that system bus 10 will not be available when the data is placed on memory bus 18, or if the time of availability of the system bus cannot be determined, the data is routed into FIFO buffer 30 by control signals on line 28 that concurrently enable buffer 30 and turn off the outputs of multiplexer 26. At the appropriate time, as conveyed by bus grant status signals on line 24, memory controller 14 issues the appropriate commands to transfer data out of buffer 30 through multiplexer 26 via line 27b and onto system bus 10.

With reference now to FIG. 4, a memory access transaction by the system of FIG. 3 is illustrated. The early bus request is generated by memory controller 14 as it decodes the read request from the requesting agent. Prediction and arbitration logic unit 22 responds with bus grant status signals while the access to memory 16 is in process. As illustrated in FIG. 4, the bus arbitration permits transmission of the data onto system bus 10 immediately upon completion of the memory access. Had it been determined in the state machine of unit 22 that system bus 10 would not be available when the memory access was completed, the bus arbitration phase would extend until the bus became available for the data transfer.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. A data processing system comprising:

(a) a data communication bus;

(b) a data memory;

(c) a data requester, coupled to the data communication bus, operable to issue a memory read request over the data communication bus for requested data stored in the data memory;

(d) a memory controller, coupled to the data communication bus and the data memory, operable to receive the memory read request and to issue read control signals to the data memory to retrieve the requested data, and to generate an early bus request signal as a function of the memory read request while access to the data memory is occurring to obtain the requested data;

(e) bus grant prediction logic, coupled to the data communication bus and the memory controller, operable to receive the early bus request signal and to generate a bus grant status signal in response thereto while access to the data memory is occurring to obtain the requested data, the bus grant status signal indicating a predicted future clock for availability of the data communication bus;

(f) data routing circuitry, coupled to the data memory, the memory controller and the data communication bus, operable to transfer the requested data retrieved from the data memory onto the data communication bus at the predicted future clock for availability indicated by the bus grant status signal.

2. The data processing system of claim 1, wherein the data routing circuitry transfers the requested data onto the data communication bus immediately upon receipt from the data memory.

3. The data processing system of claim 1, wherein the data routing circuitry comprises a data buffer for temporarily storing the requested data until the cycle for availability of the data communication bus.

4. The data processing system of claim 3, wherein the data routing circuitry further comprises a multiplexor, coupled to the data buffer, the data memory and the memory controller, operable to transfer the requested data onto the data communication bus directly from the data memory when the requested data is retrieved substantially concurrently with the cycle for availability of the data communication bus, and operable to transfer the requested data onto the data communication bus from the data buffer when the requested data is temporarily stored in the data buffer prior to the cycle for availability of the data communication bus.

5. In a data processing system having a data memory, a memory controller, and a shared data communication bus, a method of conducting a memory access transaction comprising the steps of:

(a) a data requester issuing a memory read request specifying requested data stored in the data memory;

(b) the memory controller decoding the read request to issue read control signals to the data memory for retrieving the requested data;

(c) the memory controller generating an early bus request signal as a function of the memory read request while access to the data memory is occurring to obtain the requested data;

(d) generating a bus grant status signal in a bus grant prediction unit in response to the early bus request signal while access to the data memory is occurring to obtain the requested data, the bus grant status signal indicating a predicted future cycle for availability of the data communication bus; and (e) transferring the requested data retrieved from the data memory directly onto the data communication bus if the requested data is retrieved substantially concurrently with the predicted future cycle for availability of the data communication bus, and transferring the requested data into a data buffer if the requested data is retrieved prior to the predicted future cycle for availability of the data communication bus.

6. A memory access control system for a multiprocessor computer system having a data communication bus, a data memory, and a plurality of processors coupled to the data communication bus, any one of which issues a memory read request over the data communication bus for requested data stored in the data memory, the memory access control system comprising:

(a) a memory controller means, coupled to the data communication bus and the data memory, for receiving the memory read request, for issuing read control signals to the data memory to retrieve the requested data, and for generating an early bus request signal as a function of the memory read request while access to the data memory is occurring to obtain the requested data;

(b) bus grant prediction means, coupled to the data communication bus and the memory controller means, for receiving the early bus request signal and generating a bus grant status signal in response thereto while access to the data memory is occurring to obtain the requested data, the bus grant status signal indicating a predicted future cycle for availability of the data communication bus; and (c) data routing means, coupled to the data memory, the memory controller means and the data communication bus, for transferring the requested data retrieved from the data memory onto the data communication bus at the predicted future cycle for availability indicated by the bus grant status signal.

7. The memory access control system of claim 6, wherein the data routing means transfers the requested data onto the data communication bus immediately upon receipt from the data memory.

8. The memory access control system of claim 6, wherein the data routing means comprises a data buffer means for temporarily storing the requested data until the cycle for availability of the data communication bus.

9. The memory access control system of claim 8, wherein the data routing means further comprises a multiplexor means, coupled to the data buffer, the data memory, the data communication bus and the memory controller, for transferring the requested data onto the data communication bus directly from the data memory when the requested data is retrieved substantially concurrently with the cycle for availability of the data communication bus, and for transferring the requested data onto the data communication bus from the data buffer when the requested data is temporarily stored in the data buffer prior to the cycle for availability of the data communication bus.

10. A data processing system comprising:

(a) a data communication bus;

(b) a data memory;

(c) a data requester, coupled to the data communication bus, operable to issue a memory read request over the data communication bus for requested data stored in the data memory;

(d) a memory controller, coupled to the data communication bus and the data memory, operable to receive the memory read request, to issue read control signals to the data memory to retrieve the requested data, and to generate an early bus request signal as a function of the memory read request while access to the data memory is occurring to obtain the requested data;

(e) bus grant prediction logic, coupled to the data communication bus and the memory controller, operable to receive the early bus request signal and to generate a bus grant status signal in response thereto while access to the data memory is occurring to obtain the requested data, the bus grant status signal indicating a predicted future time of availability of the data communication bus;

(f) a data buffer, coupled to the data memory and the memory controller, operable to temporarily store the requested data until the predicted future time of availability of the data communication bus; and (g) a multiplexor, coupled to the data buffer, the data memory, the data communication bus and the memory controller, operable to transfer the requested data onto the data communication bus directly from the data memory when the requested data is retrieved substantially concurrently with the predicted future time of availability of the data communication bus, and operable to transfer the requested data onto the data communications bus from the data buffer when the requested data is temporarily stored in the data buffer prior to the predicted future time of availability of the data communication bus.

11. A memory access control system for a multiprocessor computer system having a data communication bus, a data memory, and a plurality of processors coupled to the data communication bus, any one of which issues a memory read request over the data communication bus for requested data stored in the data memory, the memory access control system comprising:

(a) a memory controller means, coupled to the data communication bus and the data memory, for receiving the memory read request, for issuing read control signals to the data memory to retrieve the requested data, and for generating an early bus request signal as a function of the memory read request while access to the data memory is occurring to obtain the requested data;

(b) bus grant prediction means, coupled to the data communication bus and the memory controller means, for receiving the early bus request signal and generating a bus grant status signal in response thereto while access to the data memory is occurring to obtain the requested data, the bus grant status signal indicating a predicted future time of availability of the data communication bus;

(c) a data buffer means, coupled to the data memory, the data communication bus and the memory controller means, for temporarily storing the requested data until the predicted future time of availability of the data communication bus; and (d) a multiplexor means, coupled to the data buffer means, the data memory, the data communication bus and the memory controller means, for transferring the requested data onto the data communication bus directly from the data memory when the requested data is retrieved substantially concurrently with the predicted future time of availability of the data communication bus, and for transferring the requested data onto the data communication bus from the data buffer when the requested data is temporarily stored in the data buffer means prior to the predicted future time of availability of the data communication bus.

* * * * *